US010196972B2

(12) United States Patent
Bergman

(10) Patent No.: US 10,196,972 B2
(45) Date of Patent: *Feb. 5, 2019

(54) ADJUSTING OF AIR-FUEL RATIO OF A TWO-STROKE INTERNAL COMBUSTION ENGINE

(71) Applicant: HUSQVARNA AB, Huskvarna (SE)

(72) Inventor: Mikael Bergman, Bankeryd (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,656

(22) Filed: Aug. 10, 2017

(65) Prior Publication Data

US 2017/0335763 A1    Nov. 23, 2017

Related U.S. Application Data

(63) Continuation of application No. 14/237,199, filed as application No. PCT/SE2011/050979 on Aug. 5, 2011, now Pat. No. 9,759,127.

(51) Int. Cl.
*F02B 75/02* (2006.01)
*F02B 33/04* (2006.01)
(Continued)

(52) U.S. Cl.
CPC ............ *F02B 75/02* (2013.01); *F02B 33/04* (2013.01); *F02B 63/02* (2013.01);
(Continued)

(58) Field of Classification Search
CPC .......... F02B 75/02; F02B 33/04; F02B 63/02; F02B 25/22; F02B 25/04; F02B 2075/025;
(Continued)

(56) References Cited

U.S. PATENT DOCUMENTS 4,984,540 A    1/1991  Morikawa
5,033,440 A *  7/1991  Kumagai ............ F02D 41/1479
                                              123/680
(Continued)

FOREIGN PATENT DOCUMENTS

CN    1434896 A    8/2003
CN    1637255 A    7/2005
(Continued)

OTHER PUBLICATIONS

International Search Report and Written Opinion for International Application No. PCT/SE2011/050979 dated Mar. 27, 2012.
(Continued)

*Primary Examiner* — Grant Moubry
(74) *Attorney, Agent, or Firm* — McNair Law Firm, P.A.

(57) ABSTRACT

To meet stringent emission standards and improve performance of two-stroke crankcase-scavenged engines, the muffler (13) of the engine is provided with mixing means (130, 31) for mixing the exhaust gases (42) resulting from the mixture participating in combustion and gases resulting from scavenging, so that a substantially homogenous gaseous mixture is formed within the muffler (13), and means (81) for sensing oxygen concentration is located in the homogeneous gaseous mixture and are configured to provide an output value to a control unit (80) for controlling supply of fuel to the engine and thereby the air-fuel ratio in the combustion chamber (41). The muffler (13) suitably is provided with a catalytic element (140), preferably a three-way catalyst. The engine (1) preferably is a stratified charge engine.

20 Claims, 5 Drawing Sheets

(51) Int. Cl.
*F02D 41/14* (2006.01)
*F02D 35/00* (2006.01)
*F02B 63/02* (2006.01)
*F02B 25/22* (2006.01)
*F02B 25/04* (2006.01)
*F01N 3/10* (2006.01)

(52) U.S. Cl.
CPC ..... *F02D 35/0053* (2013.01); *F02D 41/1439* (2013.01); *F02D 41/1454* (2013.01); *F01N 3/101* (2013.01); *F02B 25/04* (2013.01); *F02B 25/22* (2013.01); *F02B 2075/025* (2013.01); *F02D 41/1488* (2013.01); *F02D 2400/04* (2013.01); *F02D 2400/06* (2013.01); *Y02T 10/22* (2013.01)

(58) Field of Classification Search
CPC ............. F02D 41/1454; F02D 41/1439; F02D 14/1488; F02D 35/0053; F02D 2400/06; F02D 2400/04; F01N 3/101; Y02T 10/22
See application file for complete search history.

(56) References Cited

U.S. PATENT DOCUMENTS

| | | | |
|---|---|---|---|
| 5,701,855 A | 12/1997 | Kurihara et al. | |
| 6,226,982 B1* | 5/2001 | Poggio | F02D 41/0295 60/274 |
| 6,484,709 B1* | 11/2002 | Strauss | F02B 61/045 123/65 R |
| 6,491,033 B1* | 12/2002 | Motose | F02B 61/045 123/683 |
| 6,560,960 B2* | 5/2003 | Nishimura | F01N 3/0842 123/399 |
| 6,698,186 B2 | 3/2004 | Ueno et al. | |
| 6,851,402 B2* | 2/2005 | Rosskamp | F02B 25/14 123/65 P |
| 6,912,979 B2 | 7/2005 | Fleig et al. | |
| 7,225,800 B2 | 6/2007 | Nakagawa et al. | |
| 7,404,293 B2* | 7/2008 | Ozawa | F02B 33/34 123/563 |
| 7,440,839 B2* | 10/2008 | Cesario | F02D 35/023 701/106 |
| 8,141,345 B2* | 3/2012 | Schnaibel | F02D 41/0295 60/274 |
| 9,022,011 B2* | 5/2015 | Andersson | F02D 31/006 123/676 |
| 2002/0040578 A1 | 4/2002 | Rosskamp et al. | |
| 2002/0146947 A1 | 10/2002 | Ishii | |
| 2004/0052695 A1 | 3/2004 | Schlessmann et al. | |
| 2005/0284130 A1* | 12/2005 | Takubo | F01N 3/10 60/285 |
| 2008/0148711 A1 | 6/2008 | Takubo | |

FOREIGN PATENT DOCUMENTS

| | | |
|---|---|---|
| CN | 101614161 A | 12/2009 |
| CN | 101749144 A | 6/2010 |
| DE | 202006018582 U1 | 4/2008 |
| DE | 102009045792 A1 | 5/2011 |
| EP | 0159734 A1 | 10/1985 |
| FR | 2722248 A1 | 1/1996 |
| GB | 1410413 A | 10/1975 |
| JP | H08144817 A | 6/1996 |
| JP | H08189386 A | 7/1996 |
| WO | 9701023 A1 | 1/1997 |
| WO | 2010114438 A1 | 10/2010 |

OTHER PUBLICATIONS

International Preliminary Report on Patentability for International Application No. PCT/SE2011/050979 dated Feb. 11, 2014.

"Emission Control of Small Spark-Ignited Off-Road Engines and Equipment", Retrieved from the Internet: URL:http://www.meca.org/galleries/files/sore_white_paper_0109_final.pdf, published on Jan. 2009, pp. 28.

Mingrui, W., "Stratified Scavenging System of Two-Stroke Gasoline Engine and Zero-Dimension Mathematic Model," Small Internal Combustion Engine and Motorcycle, vol. 30, No. 6, pp. 4-7 (Jun. 30, 2001) (See Abstract).

Sheng-liu, Z., et al., "Study of Double Entry Stratified Charging on a Two Cycle Gasoline Engine," Transactions of CSICE, vol. 18, No. 4, pp. 431-434 (2000) (See Abstract).

Shizhong, W., "The Study Improving the Performance of a Two-Stroke Gasoline Engine," Journal of Guangxi University, vol. 18, No. 4, pp. 1-6 (Dec. 1993) (See Abstract).

Tao, Du., et al., "The Application of Air- Layer Scavenging Technology on General Engine," Internal Combustion Engine & Powerplant, Isuue 5, pp. 29-31 (2007) (See Abstract).

Zongzhuang, S., et al., "An Investigation into Reduction of Fuel Consumption of Small Two-Stroke Gasoline Engine with Ail Leading Type Stratified Scavenging Method," Transactions of CSICE, vol. 16, No. 4, pp. 497-504 (1998) (See Abstract).

* cited by examiner

US 10,196,972 B2

ADJUSTING OF AIR-FUEL RATIO OF A TWO-STROKE INTERNAL COMBUSTION ENGINE

CROSS REFERENCE TO RELATED APPLICATIONS

This application is a continuation of U.S. patent application Ser. No. 14/237,199 filed Feb. 5, 2014, which is a national phase entry of PCT/SE2011/050979 filed Aug. 5, 2011, the entire contents of which are hereby incorporated by reference in their entirety.

TECHNICAL FIELD

The present invention relates to an air-fuel ratio control system of a two-stroke stroke crankcase-scavenged internal combustion engine and a method of adjusting the air-fuel ratio of such engine. The air-fuel ratio is adjusted in a fuel supply section, such as a carburetor or a fuel-injection system, and the fuel supply section includes a control unit for adjusting the air-fuel ratio. An oxygen concentration sensing means is provided in a feedback loop with the control unit to aid in providing a proper air-fuel ratio of the engine. Further, the engine produces exhaust gases resulting from an air-fuel mixture participating in combustion and additional gases resulting from the scavenging.

BACKGROUND ART

Lambda sensors or oxygen sensors are typically used to reduce emissions for vehicles with four-stroke engines by ensuring that the engines burn their fuel efficiently and cleanly. The sensor is normally configured to have one electrode in an exhaust gas pipe, whilst another electrode is in contact with the ambient air. The sensor operates by measuring the difference in oxygen concentration between the exhaust gas and the ambient air. The sensor typically outputs a voltage, and shows a step-type voltage characteristic around where the air-fuel ratio approaches the stoichiometric one. A stoichiometric air-fuel ratio corresponds to X, =1 and implies a good compromise between power, fuel economy and emissions for the four-stroke engine. X, <1 implies a higher voltage output and corresponds to excess of fuel and X, >1 implies a lower voltage output and corresponds to excess of air. When the engine is under low-load conditions (such as when accelerating very gently, or maintaining a constant speed), it is operating in a so called 'closed-loop' mode. This refers to a feedback loop between a control unit and the lambda sensor, in which the control unit adjusts the quantity of fuel and expects to see a resulting change in the response of the lambda sensor. This loop forces the engine to operate both slightly lean and slightly rich on successive loops, as it attempts to maintain a mostly stoichiometric ratio on average. When the engine is under high load (e.g. wide open throttle), the output of the oxygen sensor is ignored, and the control unit automatically enriches the mixture to protect the engine, as misfires under load are much more likely to cause damage. This is referred to an engine running in 'open-loop' mode. Any changes in the sensor output will be ignored in this state, since the fuel injection is controlled according to a predetermined so called fuel map. Closed-loop feedback-control of fuel varies the fuel output according to real-time sensor data rather than operating with a predetermined (open-loop) fuel map. Normally, lambda sensors only work effectively when heated to approximately 300° C., and consequently many one of today's sensors have integrated heating elements to ensure proper operation.

A disadvantage of four-stroke engines is that they are fairly heavy, and therefore they are not very suitable for applications that are intended to be carried by an operator. In fact, there are numerous applications in which two-stroke engines are preferred, such as chainsaws, trimmers, cut-off machines or blowers, etc, for which a high power-to-weight ratio is especially appreciated. Two-stroke engines are also advantageous in terms of their simple design and long service life. However, a major drawback with two-stroke engines is their poor emission performance. To meet the more stringent emission standards, there have been some attempts to regulate air-fuel ratio in two-stroke engines using a lambda sensor and a control unit in a feedback loop. However, the way λ is measured in an exhaust pipe in a four-stroke engine is not applicable to a two-stroke engine, since scavenging air will follow the exhaust gas resulting from the combusted air-fuel mixture in the combustion chamber into the exhaust gas pipe. Thus, λ at a corresponding point in an exhaust pipe will fluctuate and will not correspond to λ for the gases participating in combustion.

JP8144817 and JP8189386 (Yamaha) disclose a way of using a lambda sensor connected to a control unit in a two-stroke engine. To solve the problem with the scavenging air being pumped into the exhaust passage, a sub-exhaust passage in communication with the combustion chamber has been introduced, in which passage λ is detected. The sub-exhaust passage is provided with valves which are configured to close and open the passage in a manner such that it is closed before the scavenging air arrives. Thus, the detected λ will be near combustion λ However, this solution is rather complicated and expensive, and inter alia requires additional valves and ducts in the cylinder. Further, there is a risk that said valves may clog with soot and/or oil, for example, which reduces functionality of the valves and thereby reduces the accuracy of the combustion λ measurement.

DE202006018582U1 (Dolmar) also discloses a way of using a lambda sensor connected to a control unit in a two-stroke engine. In analogy with the two Japanese documents above, this German document discloses a way to improve measuring of combustion λ but has located the lambda sensor in a piston ported space in the cylinder. The space opens up in the combustion chamber and is repeatedly opened and closed by the moving piston, such that it is closed before the scavenging air arrives in the combustion chamber. Thus, the detected λ will be near combustion k. A disadvantage with this solution is that a desired combustion λ in a two-stroke engine is about 0.70 to 0.95. Due to the operation of today's lambda sensors, such low values are difficult to detect. Although, broadband lambda sensors are suitable for detecting λ-values within said range, they are far too expensive for this application. Also, a combustion λ detection in an encapsulated space that opens and closes to the combustion chamber does not really seem to be very accurate as the space will not be fully emptied after λ has been detected and, thus, the gases in which λ is detected will probably be gases resulting from earlier combustions. Further, there will probably gather oil in said space, which may cause the decisive portion of the lambda sensor to be at least partly covered in oil, which reduces the functionality of the lambda sensor.

U.S. Pat. No. 6,912,979 (Stihl) describes a way of adjusting λ in a crankcase in a range of approximately 0.2 to 0.6, and, thus, unlike what is proposed in the Japanese documents and the German document, λ is not detected in the exhaust gas of the air-fuel mixture participating in combustion. The U.S. document means that having this λ-range in the crankcase implies that λ in the combustion chamber may be adjusted to the range 0.70 to 0.95. However, such low values of λ, 0.2-0.6, are difficult to detect in a cost-effective way, as was discussed in above section.

It has proved beneficial for the two-stroke engines to adjust λ in the range 0.70-0.95 in the combustion chamber, which means that there is an excess of fuel. This range, however, as discussed in earlier sections is difficult to detect using a conventional lambda sensor. This means that even though the Japanese documents and the German document may have come close to detecting combustion λ, their solutions will be far too expensive to produce. Hence, there is a need to solve the problems above in order to meet the more stringent emission standards and improve performance of two-stroke engines.

SUMMARY OF THE INVENTION

It is an object of the present invention to provide a method of adjusting an air-fuel ratio of a two-stroke crankcase-scavenged internal combustion engine which eliminates the disadvantages of prior art.

This object is achieved by providing a method of adjusting an air-fuel ratio of a two-stroke crankcase-scavenged internal combustion engine, by providing the arrangement in the first paragraph and providing an oxygen content sensing means in a substantially homogeneous mixture of the exhaust gases (said mixture being a mixture of both gases resulting from combustion and gases resulting from scavenging), and wherein the method further comprises the steps of:
 a) detecting an actual value of the oxygen concentration sensing means;
 b) comparing the actual value to a target value; and
 c) adjusting the air-fuel ratio in response to said comparison to reduce the difference between the target value and the actual value. Preferably repeating the steps a) to c).

Thereby, the described disadvantages of detecting a λ-value only in the exhaust gas portion resulting from the air-fuel mixture participating in combustion are eliminated, i.e. there is no need for additional valves or ducts in the cylinder. This significantly lowers the manufacturing costs and costs for the increased number of parts. Also, it has proved very beneficial to detect λ in the substantially homogeneous mixture of gases resulting from combustion and gases resulting from scavenging, since at least for certain configurations of the engine the λ-value in said homogeneous mixture equals 1 for a desired air-fuel ratio in a combustion chamber of the engine. Further, a λ-value near 1 may be detected with a lambda sensor of conventional type, which is quite inexpensive and does not need to be powered during operation. Further, it is very advantageous to provide the homogenous mixture of gases resulting from combustion and the gases resulting from scavenging in a muffler of the engine as then a three-way catalyst can operate inside the muffler, which is very beneficial for reducing exhaust emissions.

Preferably, the method additionally includes the following steps:
 d) as a first step detecting at least one engine parameter;
 e) for certain first conditions with respect to said at least one engine parameter performing steps a) to c), said first conditions occurring at least during periods;
 f) for certain second conditions with respect to said at least one engine parameter, replacing at least step c), and preferably steps a), b) and c), by step g);
 g) using a fuel map for determining a proper air-fuel ratio, and adjusting the air-fuel ratio in response to said fuel map.

Thereby, the engine is able to shift between an open loop mode, using a fuel map, and a closed loop mode using the output value of the oxygen concentration sensing means. This is very beneficial as the closed loop mode may not work sufficiently for all conditions, such as e.g. for high load or at start up.

It is a further object of the present invention to provide an air-fuel ratio control system of a two-stroke crankcase-scavenged internal combustion engine which eliminates the disadvantages of prior art.

This object is achieved by a control system of the type comprising a control unit for adjusting an air-fuel ratio in a combustion chamber of the engine by at least controlling the amount of fuel supplied to the engine. Further, an exhaust gas duct is configured to discharge exhaust gases from the engine, and a muffler is in communication with the exhaust gas duct. Further, means for sensing oxygen concentration is located in the muffler, and being configured to provide an output value to the control unit.

Preferably the means for sensing oxygen concentration is located in the muffler at a position where a homogenous or at least substantially homogenous gaseous mixture has been formed by the mixture participating in combustion and gases resulting from scavenging.

Preferably the muffler is provided with mixing means for mixing the exhaust gases resulting from the mixture participating in combustion and gases resulting from scavenging, which enables a substantially homogenous gaseous mixture within the muffler. The means for sensing oxygen concentration is preferably located downstream the mixing means.

Thereby, the described disadvantages of having the lambda sensor in the portion of exhaust gas only resulting from the air-fuel mixture participating in combustion are eliminated. Also, it has proved very beneficial to locate the means for sensing oxygen concentration to the homogenous mixture of gases resulting from combustion and gases resulting from scavenging, since at least for certain configurations of the engine the lambda value in said homogeneous mixture equals 1 for a desired air-fuel ratio in a combustion chamber of the engine. Further, a lambda value near 1 may be detected with a lambda sensor of conventional type, which is quite inexpensive, and does not need to be powered during operation.

Further embodiments are set forth in the dependent claims and in the following description and drawings.

BRIEF DESCRIPTION OF THE DRAWINGS

In the following, the invention will be described in more detail with reference to preferred embodiments and the appended drawings.

MODE(S) FOR CARRYING OUT THE INVENTION

Figure 1:
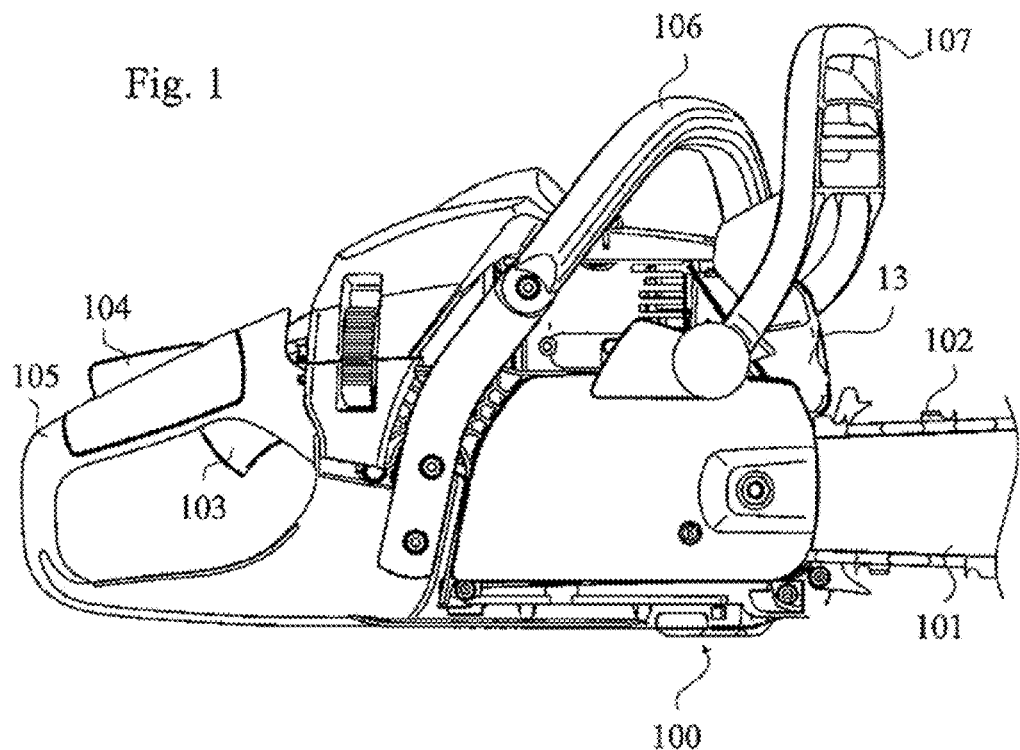
FIG. 1 is a side view of a handheld power tool, more specifically a chainsaw.

FIG. 1 illustrates a handheld power tool, more exactly a chainsaw, according to an exemplary embodiment of the present invention. The chainsaw 100 includes a housing and a cutting unit. The housing encloses an internal combustion engine 1, not shown, having a muffler 13. Further, the cutting unit includes a guide bar 101 which is attached to the housing. The cutting unit also includes a chain 102, which is supported over a peripheral guiding slot provided in the guide bar 2. A throttle trigger 103 and a cooperating release trigger 104 are provided to activate or deactivate the movement of the chain 102 along the peripheral guiding slot of the guide bar 101. Further, the housing may include a rear handle 105 and a front handle 106. Further, a front handguard 107 and combined chain brake lever may be present to safeguard a user during a cutting operation.

Figure 2:
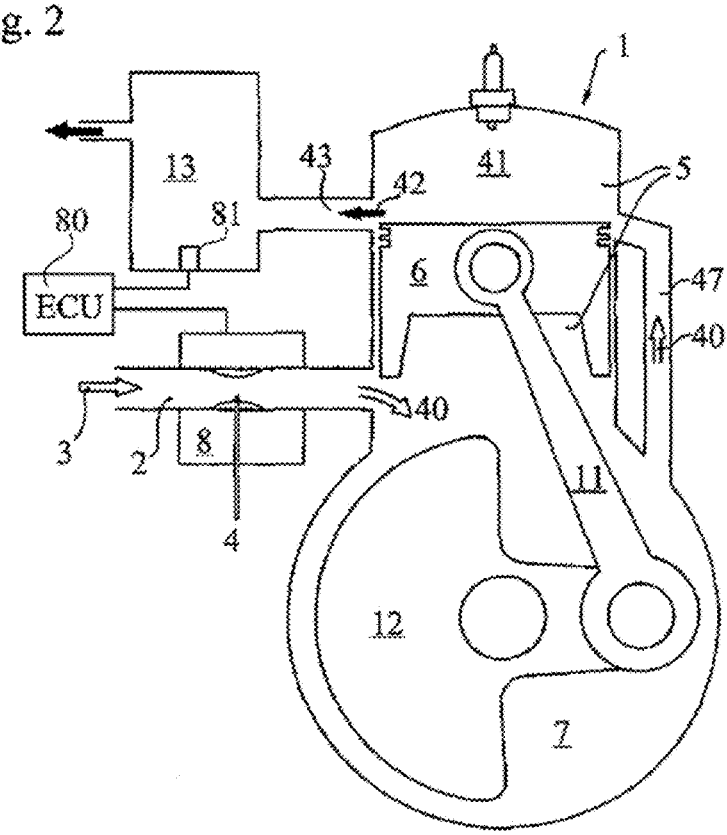
FIG. 2 is a schematic view of a crankcase-scavenged two-stroke internal combustion engine with a fuel supply section and oxygen concentration sensing means located in a muffler.

In the schematic drawing FIG. 2, reference numeral 1 designates an internal combustion engine of two-stroke type. It is crankcase-scavenged, i.e. a mixture 40 of air 3 and fuel supplied through a line 4 to a fuel supply section 8 (e.g. a carburetor or a low pressure fuel injection system) is drawn to the engine crankcase 7. In the present context, the term "fuel" should be understood as including also a mixture of fuel and oil, depending on if the fuel tank is adapted to contain a fuel and oil mixture that also lubricates the engine, or if separate fuel and oil tanks are used and where the engine is lubricated by oil injection into the crankcase, for example.

From the crankcase, the mixture 40 is carried through one or several scavenging passages 47 up to the engine combustion chamber 41. The chamber is provided with a spark plug igniting the compressed air-fuel mixture. Exhausts 42 exit through the exhaust port 43 and through the muffler 13. All these features are entirely conventional in an internal combustion engine and for this reason will not be described herein in any closer detail. The engine has a piston 6 which by means of a connecting rod 11 is attached to a crank portion 12 equipped with a counter weight. In this manner the crank shaft is turned around. In FIG. 2, the piston 6 assumes an intermediate position, where flow is possible both through an intake port, the exhaust port 43 and through the scavenging passage 47. The mouth of an intake passage 2 in the fuel supply section 8 into the cylinder 5 is called intake port. Thus the intake passage 2 is closed by the piston 6. By opening and closing the intake passage 2 varying flow speeds and pressures are created inside the passage. These variations largely affect the amount of fuel supplied when the fuel supply section 8 is of carburetor type. Since a carburetor has an insignificant fuel feed pressure, the amount of its fuel feed is entirely affected by pressure changes in the intake passage 2. The subject invention makes use of these fuel amount variations in order to create simple and safe control of the amount of fuel supplied. The supplied amounts of fuel are essentially affected by the varying flow speeds and pressures inside the intake passage 2 that are caused by the opening and the closing of the latter. And further, since the crankcase in crankcase-scavenged two-stroke engines or crankcase-scavenged four-stroke engines can hold a considerable amount of fuel and consequently serve as a leveling reservoir, it is not necessary to adjust the fuel supply for each revolution, i.e. adjusting the fuel supply in one revolution will affect subsequent revolutions. Although the indirect fuel supply system shown in FIG. 2 is of carburetor type, it can alternatively or additionally be a low pressure fuel injection system. The engine may also include a direct fuel supply system, i.e. a direct injection means injecting fuel directly into the combustion chamber 41. Thus the combustion chamber 41 can be supplied with fuel indirectly by scavenging an air and fuel mixture from the crankcase 7 and directly by injecting fuel into the combustion chamber 41.

An electronic control unit (ECU) 80 is provided for adjusting the air-fuel ratio in the combustion chamber 41 of the engine 1 by at least controlling the amount of fuel supplied to the engine 1. In the shown embodiment, the control is carried out by the control unit 80 that opens and closes a fuel valve, not shown, in the fuel supply system. The fuel valve may be a bistable two-position valve. The muffler 13 is provided with a means 81 for sensing oxygen concentration in the exhaust gas, and the means 81 is configured to provide an output value to the control unit 80.

Figure 3:
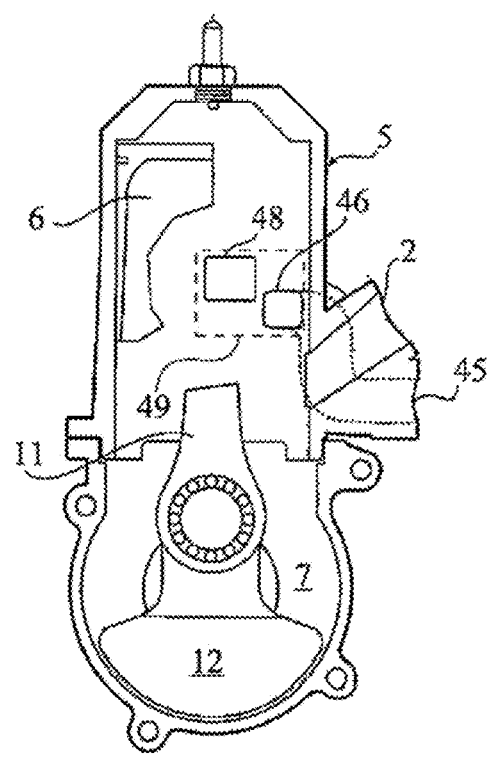
FIG. 3 is a cross-sectional side view of a two-stroke engine of stratified charge type.

FIG. 3 shows a cylinder 5 that is mounted on a crankcase 7. A spark plug is arranged at the top of the cylinder. A part of the connecting rod 11 can be seen in the crankcase and a part of the piston 6 can be seen in the cylinder. These parts are not shown in their entirety, so that some features can be seen more clearly. Naturally, the cylinder 5 also has an exhaust outlet connected to a muffler, which are not at all illustrated in FIG. 3 for the sake of clarity. It should also be noted that in FIG. 3 the cylinder is positioned on top of the crankcase. No major variations should normally occur concerning this orientation, however, this orientation shall still not be regarded as a restriction of the present invention.

Furthermore, the cylinder 5 is equipped with an intake passage 2, through which the air/fuel mixture is supplied to the cylinder from a carburetor (not illustrated in FIG. 3). The cylinder 5 also has a fresh air supply duct 45 with at least one wall passage for supply of fresh air. Each wall passage exits on the inside of the cylinder wall in a connecting port 46. Further, each wall passage is orientated obliquely downwards in relation to the connecting port 46, and extends past the intake passage 2 and to the fresh air supply duct 45 on the outside of the cylinder, which is located below the mouth of the intake passage 2.

In addition, as described above, the cylinder has at least one scavenging passage 47 (FIG. 2), which leads to a scavenging port 48. The scavenging port can be shaped radially out from the cylinder in a conventional way. The cylinder's interaction with the engine's remaining but not illustrated parts (e.g. carburetor, scavenging ducts, exhaust outlet and muffler etc.) is regarded as so well known to a man skilled in the art that a more detailed description of these parts and their function as a whole is superfluous.

Figure 4:
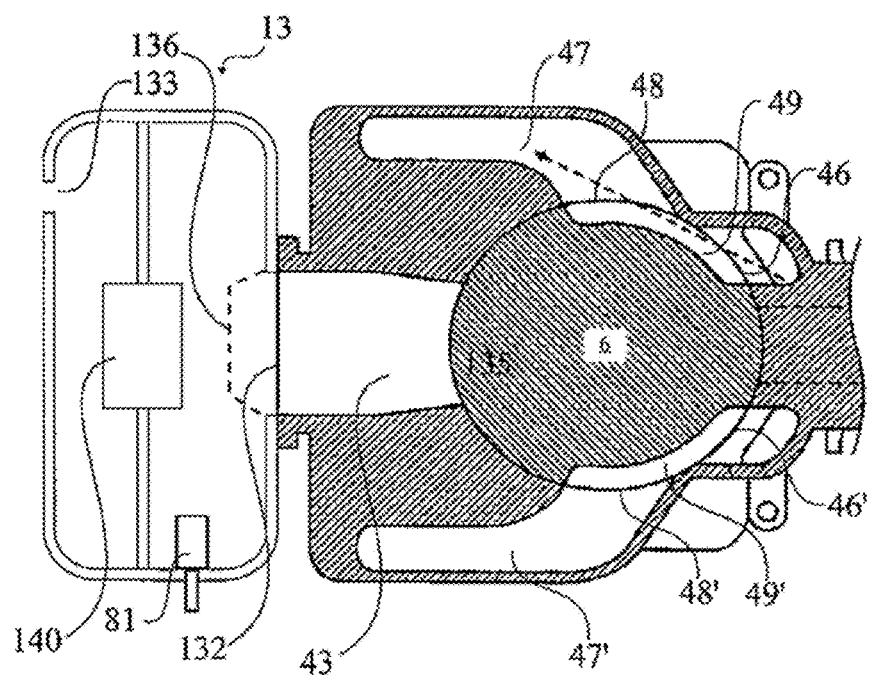
FIG. 4 is a cross-sectional top view of a crankcase-scavenged two-stroke internal combustion engine of stratified charge type, which is connected to a muffler having a catalytic element and means for mixing exhaust gases.

In FIG. 4, parts that are symmetrically located on the engine, the part on the one side has been given a numeric designation, while the part on the opposite side has been given the same numeric designation, but with a prime (')

symbol appended thereto. In general, when referring to the drawings, the corresponding parts designated with a prime symbol are located above the plane of the paper and are therefore not expressly shown in some views.

From the crankcase, the air-fuel mixture is carried through one or several scavenging ducts 47, 47' up to the combustion chamber, when the piston is in a low position. The scavenging ducts 47, 47' each have at least one scavenging port 48, 48' that opens into the cylinder. The scavenging ducts 47, 47' connect the scavenging ports 48, 48' to the crankcase. The scavenging ducts 47, 47' can be arranged radially outwards from the cylinder in the conventional way, or, as shown in FIG. 4, be arranged tangentially from the scavenging ports 48, 48'. The scavenging ports 48, 48' connects to the combustion chamber at certain piston positions, i.e. the movement of the piston controls the opening and closing of the scavenging ports 48, 48' to the combustion chamber. Alternatively, the opening/closing of the scavenging ports 48, 48' could be controlled by check valves, e.g. reed valves, not shown. Close to each scavenging port 48, 48', and located somewhat further down along the cylinder wall, a corresponding additional air port 46, 46' for fresh air is arranged. An additional air inlet (not shown), which is equipped with a restriction valve (not shown), has an additional air duct that splits into multiple branch extensions 45, 45', exemplarily two, that terminate at the additional air ports 46, 46'. The additional air inlet takes air via an air filter, not shown.

During running of the engine 1, which will not be described in closer detail here, the additional air ports 46, 46' will connect to the scavenging ports 48, 48' via a recess 49, 49' in the piston at certain piston positions, i.e. the connection is piston controlled. This recess is illustrated as a dashed rectangle 49 in FIG. 3. Thereby fresh air can flow through the air inlet into the scavenging ducts 47, 47'. Alternatively the connection between the additional air ports 46, 46' and the scavenging ports 48, 48' could be controlled by check valves, e.g. reed valves. The scavenging ducts 47, 47' will be partly or fully filled with fresh additional air in a direction from the scavenging ports 48, 48' towards the crankcase. As the piston continues to move, the connection between the additional air ports 46, 46' and the scavenging ports 48, 48' closes, and thereafter the scavenging ports 48, 48' will open up to the combustion chamber 41, first feeding additional air to evacuate the exhaust fumes through the exhaust port 43 followed by the air/fuel mixture from the crankcase.

Consequently, in a two-stroke crankcase-scavenged engine 1, where additional air is supplied to at least one scavenging duct 47 during an upward stroke of the engine piston 6, the supply to said scavenging duct 47 is controlled by a piston ported valve 6, 46, 46', 48, 48', 49, 49', 47, 47', 45, and the state, i.e. open or closed, of the valve 6, 46, 46', 48, 48', 5 49, 49', 47, 47', 45 depends on position of the engine piston 6.

In the embodiment shown in FIG. 4, the muffler 13 is mounted directly to the exhaust port 43 of the cylinder 5 with a muffler inlet opening 132 aligned with the cylinder exhaust port 43. The muffler 13 suitably is a catalytic muffler, having at least one catalytic element 140 to reduce the emissions of unburnt fuel. The element 140 is of conventional design and preferably made of a great length of thin metal wire coated with catalytic material and prepared to form a flow-through grid. Alternatively thin layers of coated sheet metal, corrugated and flat, could be wound to form an element. It is also possible to use a number of coated baffles inside the muffler to perform the catalytic function.

Figure 7:
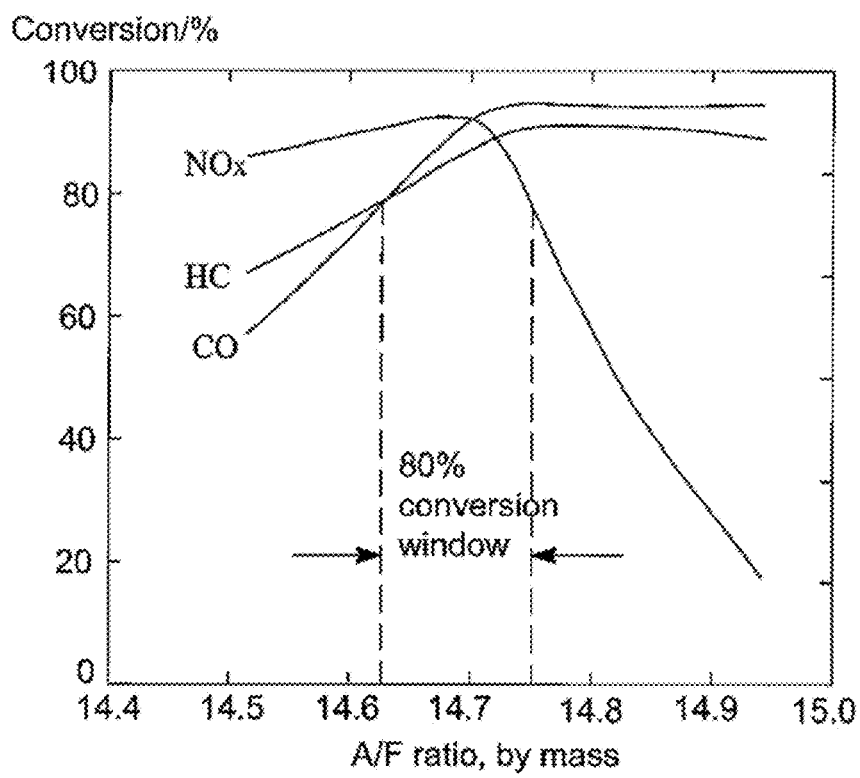
FIG. 7 is a diagram showing the conversion efficiency for a three-way catalyst as a function of exhaust gas air/fuel ratio.

The catalytic element 140 preferably is a three-way catalyst. A three-way catalytic converter has three simultaneous tasks:
1. Reduction of nitrogen oxides to nitrogen and oxygen: $2NO_x \rightarrow xO_2 + N_2$
2. Oxidation of carbon monoxide to carbon dioxide: $2CO + O_2 \rightarrow 2CO_2$
3. Oxidation of unburnt hydrocarbons (HC) to carbon dioxide and water: $C_xH_{2x+2} + [(3x+1)/2]O_2 \rightarrow xCO_2 + (x+1)H_2O$ Three-way catalysts are efficient when the engine is operated within a narrow band of air-fuel ratios near stoichiometry, such that the exhaust gas oscillates between rich (excess fuel) and lean (excess oxygen) conditions. However, conversion efficiency falls very rapidly when the engine is operated outside of that band of air-fuel ratios. Under lean engine operation, there is excess oxygen and the reduction of $NO_x$ is not favored. Under rich conditions, the excess fuel consumes all of the available oxygen prior to the catalyst, thus only stored oxygen is available for the oxidation function. Closed-loop control systems are necessary because of the conflicting requirements for effective $NO_x$ reduction and HC oxidation. The control system must prevent the $NO_x$ reduction catalyst from becoming fully oxidized, yet replenish the oxygen storage material to maintain its function as an oxidation catalyst. Therefore, engines fitted with 3-way catalytic converters generally are equipped with a computerized closed-loop feedback fuel supply system using one or more oxygen sensors. FIG. 7 is a diagram showing the conversion efficiency for NO, CO and HC for a three-way catalyst as a function of exhaust gas air/fuel ratio.

In addition to the catalytic element 140, the muffler 13 houses mixing means 130, 131; 136 that enables mixing of the exhaust gases 42 so as to achieve the homogenous mixture in at least a portion of the muffler 13. The mixing means is a structure, which includes a grid 136 (FIG. 4) and/or a wall 130 (FIGS. 5 and 6) and/or an aperture 131 (FIGS. 5 and 6) and/or a net and/or any other structure mixing the gases and is preferably configured so as to make at least a portion of the exhaust gas flow divert from its direction when passing through the exhaust port 43 and the inlet 132 of the muffler 13. Downstream of the mixing means 130, 131; 136 in the muffler 13, the oxygen concentration sensing means 81 is mounted in order to be located in an exhaust gas flow that is as homogeneous as possible and, thus, give a correct value of the oxygen concentration. The mixing means 130, 131; 136 mix the exhaust gases 42 resulting from the mixture participating in combustion and gases resulting from scavenging, so that a homogenous gaseous mixture is formed within the muffler 13. The muffler also includes a muffler outlet 133 downstream the catalyst 140.

Figure 5:
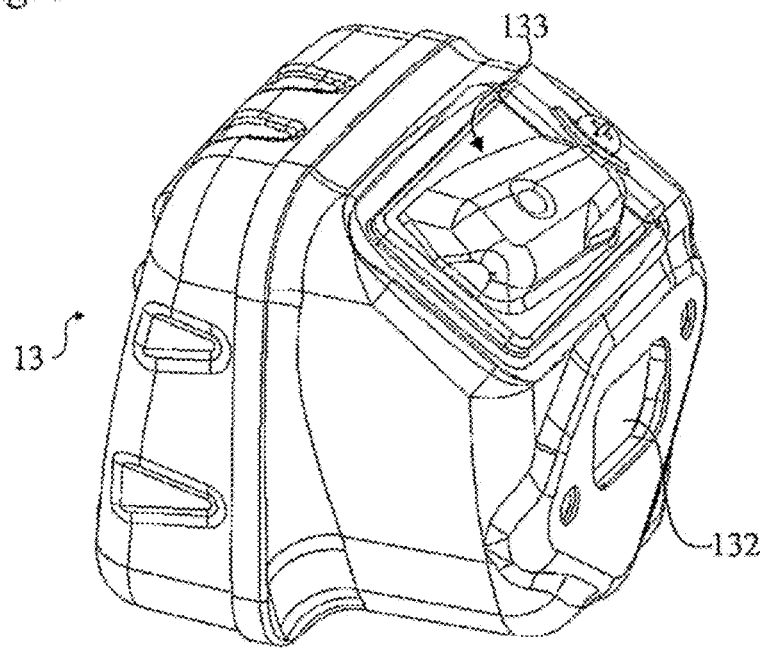
FIG. 5 is a perspective view of the muffler of FIG. 1.
Figure 6:
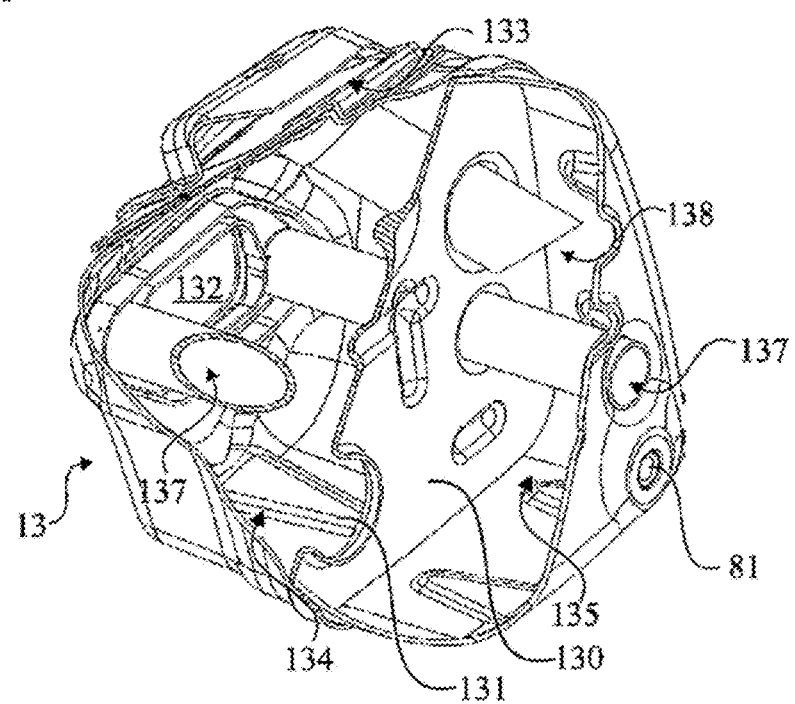
FIG. 6 is a cross-sectional perspective view of the muffler of FIG. 5 showing means for mixing exhaust gases.

Further, as is shown in FIGS. 5 and 6, the muffler 13 is intended to be attached to the cylinder 5 by means of the screws, not shown. Inside the muffler 13, each of the two screws will extend through a surrounding protective tube 137, protecting the screws from contact with the exhaust gases. The exhaust gases enters through muffler inlet opening 132, thereafter passing the aperture 131 in the wall or baffle 130 dividing the muffler in two 20 chambers, first chamber 134 upstream the mixing means 130, 131 and a second chamber 135 downstream the mixing means 130, 131. The oxygen concentration sensing means 81 is located in the second chamber 135. The exhaust gases exits the muffler through the tube 138 and out through the muffler outlet 133. The muffler of FIGS. 5 and 6 is shown without a catalyst 140, however if to be added the catalyst should be placed downstream of the oxygen concentration sensing means 81.

The oxygen concentration sensing means is a conventional lambda sensor 81, and a detailed description thereof is superfluous. For instance a Zirconia, e.g. the oxygen sensor LSM 11 from Bosch, or Titania sensor could be used. The sensor protrudes into the flow of exhaust gases resulting from an air-fuel mixture participating in combustion and additional gases resulting from scavenging and is designed such that the combined gases flow around one electrode, while the other electrode is in contact with the outside air (atmosphere). Measurements are taken of the residual oxygen concentration in the combined exhaust gas. The catalytic effect of the electrode surface at the exhaust gas end of the sensor produces a step-type sensor-voltage profile in the area around $\lambda=1$. If desired, the active sensor ceramic (which may be a solid $ZrO_2$ solid electrolyte) may be heated from inside by means of a ceramic tungsten heater, so that the temperature of the sensor ceramic is maintained above the 350° C. function limit irrespective of the exhaust gas temperature. However, in the present application generally no such heating is required.

Figure 8:
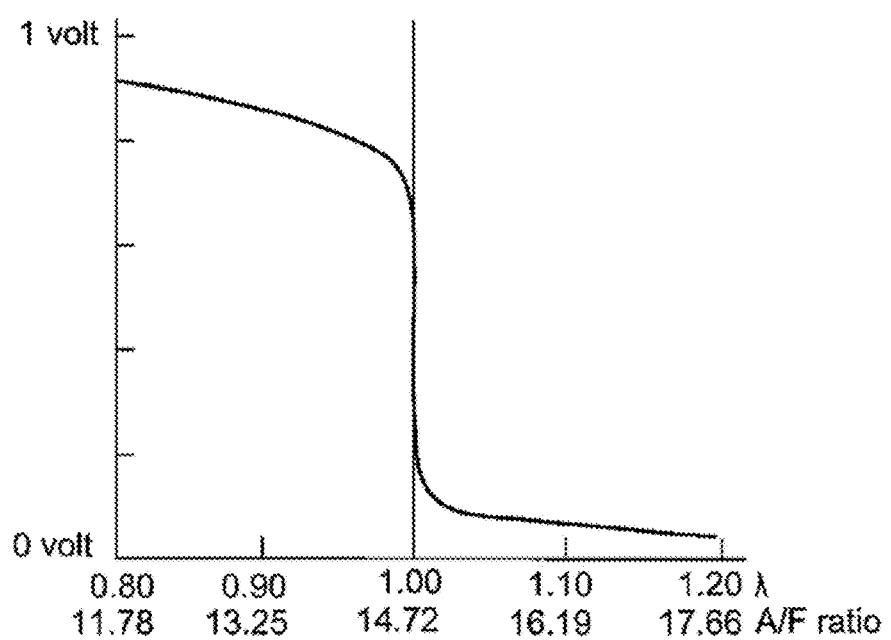
FIG. 8 shows the step-type voltage characteristic of a lambda sensor around where the air-fuel ratio approaches stoichiometric, which means lambda=1.

FIG. 8 is a diagram illustrating the pronounced step in the voltage output signal from the lambda sensor 81 at varying oxygen concentrations. As can be seen, the lambda sensor 81 is very efficient to detect $\lambda=1$. A lambda value of 1 in the combustion chamber 41 of the engine 1 would not work very well for a hand held power tool such as a chain saw, since the desired $\lambda$-value is in the range of 0.7 to 0.95. However since the exhaust gases are scavenged, the $\lambda$-value detected in the muffler 13 will be higher than that of the combustion chamber 41. In fact it has been discovered that $\lambda$-value of 1 in the muffler 13 makes the air-fuel ratio in the combustion chamber 41 close to optimal at least for certain engine layouts. Due to the scavenging of the exhaust gases the $\lambda$-value would vary dramatically in an unaffected exhaust gas flow and hence the mixture from combustion and the scavenging gases must be allowed to mix before measuring the $\lambda$-value. Controlling the $\lambda$-value to be around 1 in the muffler 13, provides the possibility of adding a three way catalyst 140 in the muffler downstream of the lambda sensor 81, which of course is positive in regards of emission control.

Figure 9:
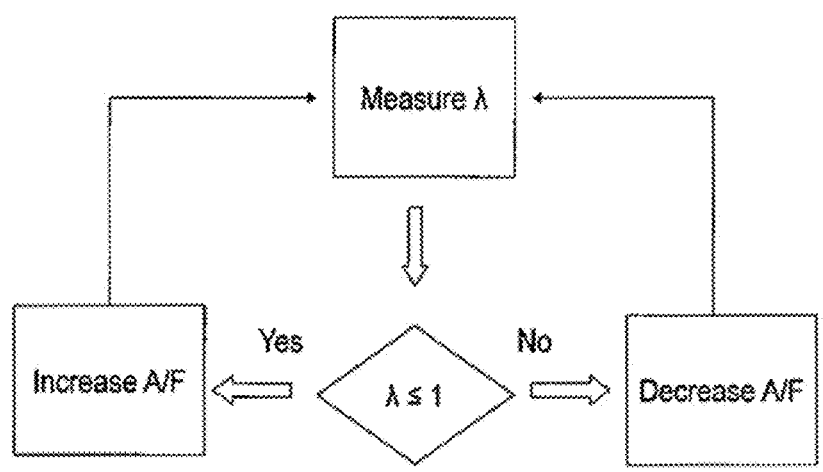
FIG. 9 is a schematic box diagram of the closed-loop adjustment of the air-fuel ratio carried out by the control unit in response to signals from the lambda sensor.

FIG. 9 is a schematic box diagram of the closed-loop adjustment of the air-fuel ratio carried out by the control unit 80 in response to signals from the lambda sensor 81. Upon receiving a signal from the lambda sensor 81, the control unit 80 determines whether the mean actual $\lambda$-value is larger or smaller than a target value, usually 1. If $\lambda<$the target value, the air-fuel ratio is increased, while if $\lambda>$the target value, the air-fuel ratio is reduced, in both cases by controlling the fuel supply valve to give the desired effect. The desired air-fuel ratio (target value) preferably corresponds to a lambda value within a range of 0.7 to 0.95 in the combustion chamber 41 of the engine 1.

Thus, the present invention provides a method of adjusting an air-fuel ratio of a two-stroke crankcase-scavenged internal combustion engine 1, in which the air-fuel ratio is adjusted in a fuel supply section 8 such as a carburetor or a fuel-injection system, and the fuel supply section 8 includes a control unit 80 for adjusting said air-fuel ratio, and the engine 1 produces exhaust gases 42 including gases resulting from an air-fuel mixture participating in combustion and additional gases resulting from scavenging. In accordance with the present invention, the method comprises the step of providing an oxygen content sensing means 81 in a substantially homogenous mixture of said exhaust gases and the method further includes the steps of:

a) detecting an actual value of the oxygen concentration sensing means 81;
b) comparing the actual value to a target value; and
c) adjusting the air-fuel ratio in response to said comparison to reduce the difference between the target value and the actual value.

Preferably the method includes repetition of the steps a) to c).

Useful additional steps are:

d) as a first step detecting at least one engine parameter,
e) for certain first conditions with respect to said at least one engine parameter performing steps a) to c), said first conditions occurring at least during periods;
f) for certain second conditions with respect to said at least one engine parameter, replacing at least step c), and preferably steps a), b) and c), by step g);
g) using a fuel map for determining a proper air-fuel ratio, and adjusting the air-fuel ratio in response to said fuel map.

Preferably the method includes repetition of the steps a) to g).

The at least one engine parameter may include engine speed and/or engine load and/or a temperature and/or opening angle of a throttle valve or suitably the position of a throttle valve shaft. It is suitable to calibrate the fuel map during run, so as to provide for a smooth shifting between a mode using the fuel map and a mode using the actual value of the oxygen concentration sensing means 81 for regulating the desired air-fuel ratio. Preferably, step g) is also prosecuted if no actual value was detected in step d).

In addition, it is suitable that adjustment of air-fuel ratio in step d) also depends on at least one other parameter, such as engine speed or temperature, and preferably, in certain conditions, such as a certain speed range, further includes adjusting the air-fuel ratio such that a mean actual value is greater than the target value, and in certain other conditions, the mean actual value is less than said target value.

Whereas the invention has been shown and described in connection with the preferred embodiments thereof it will be understood that many modifications, substitutions, and additions may be made which are within the intended broad scope of the following claims. As an example, although the preferred embodiment of the present invention above is described with reference to a chainsaw, the invention can also be applied to other handheld power tools. From the foregoing, it can be seen that the present invention accomplishes the stated object of the invention.

INDUSTRIAL APPLICABILITY

The present invention is applicable for reducing exhaust emissions from a handheld power tool, such as a chainsaw, having a two-stroke crankcase-scavenged engine, such as a stratified charge two-stroke crankcase-scavenged engine.

What is claimed is:

1. A two-stroke crankcase-scavenged stratified internal combustion engine comprising:
a fuel supply section including a control unit configured to adjust an air-fuel ratio of the engine;
scavenging ducts including an air inlet; and
an oxygen content sensor,
wherein the engine produces exhaust gases including gases resulting from an air-fuel mixture participating in combustion and additional gases resulting from scavenging, wherein a fresh air flow that is substantially free from fuel is provided through the air inlet into the scavenging ducts, wherein the oxygen content sensor is disposed in a substantially homogeneous mixture of the exhaust gases, and wherein the control unit is configured to:
a) detect an actual value of oxygen content via the oxygen content sensor;
b) compare the actual value to a target value; and
c) adjust the air-fuel ratio in response to the comparison to reduce a difference between the target value and the actual value;
d) detect at least one engine parameter;
e) for certain first conditions with respect to the at least one engine parameter, perform a) to c), where the first conditions occur at least during periods;
f) for certain second conditions with respect to the at least one engine parameter, replace a), b) and c), with g); and
g) use a fuel map for determining a desired air-fuel ratio, and adjusting the air-fuel ratio based on the fuel map, thereby providing for a smooth shifting between an open-loop fuel map mode using the fuel map and a closed-loop feedback control mode using the actual value of the oxygen content for regulating the desired air-fuel ratio.

2. The engine of claim 1, wherein the control unit is configured to repeat a) to c).

3. The engine of claim 1, wherein the control unit is configured to repeat a) to g).

4. The engine of claim 1, wherein the at least one engine parameter includes at least one of an engine speed, or an engine load, or a temperature.

5. The engine of claim 1, wherein the control unit is configured to execute g) in response to no actual value being detected in d).

6. The engine of claim 1, further comprising a muffler directly mounted to an exhaust port of a cylinder of the engine.

7. The engine of claim 6, wherein the engine configured to guide the exhaust gases through an exhaust gas duct to the muffler, and wherein a mixer is provided within the muffler, the mixer being configured to mix the exhaust gases to achieve the substantially homogenous mixture in at least a portion of the muffler.

8. The engine of claim 7, wherein the muffler is provided with an inlet opening for receiving an exhaust gas flow of said exhaust gases, wherein the exhaust gas flow has a direction at the inlet opening, and wherein the mixer is a wall, an aperture, a net or a grid, and the exhaust gas flow is exposed to the mixer to make at least a portion of the exhaust gas flow divert from the direction.

9. The engine of claim 6, wherein the oxygen content sensor is a lambda sensor, the lambda sensor being located in the substantially homogenous mixture in the muffler.

10. The engine of claim 6, further comprising providing at least one catalytic element in the muffler.

11. The engine of claim 10, wherein the catalytic element is a three-way catalyst.

12. The engine of claim 1, wherein the control unit is configured to perform the adjustment of the air-fuel ratio in c) by reducing or increasing the air-fuel ratio by adjusting the fuel supply of the engine.

13. The engine of claim 12, wherein the control unit is configured to adjust the fuel supply by controlling a fuel valve.

14. The engine of claim 1, wherein the control unit is configured to adjust the air-fuel ratio in c) based on at least one other parameter.

15. The engine of claim 1, wherein the target value is a lambda value near 1.

16. The engine of claim 1, wherein the desired air-fuel ratio corresponds to a lambda value within a range 0.7 to 0.95 in a combustion chamber of the engine.

17. An air-fuel ratio control system of a two-stroke crankcase-scavenged stratified internal combustion engine, the system comprising:
a control unit configured to adjust an air-fuel ratio of the engine by controlling an amount of fuel supplied to the engine,
an exhaust gas duct configured to discharge exhaust gases from the engine; and
a muffler in communication with the exhaust gas duct to receive the exhaust gases,
wherein the control unit is configured to:
a) detect an actual value of oxygen content in the muffler via an oxygen content sensor;
b) compare the actual value to a target value; and
c) adjust the air-fuel ratio in response to the comparison to reduce a difference between the target value and the actual value;
d) detect at least one engine parameter;
e) for certain first conditions with respect to the at least one engine parameter, perform a) to c), where the first conditions occur at least during periods;
f) for certain second conditions with respect to the at least one engine parameter, replace a), b) and c), with g); and
g) use a fuel map for determining a desired air-fuel ratio, and adjusting the air-fuel ratio based on the fuel map, thereby providing for a smooth shifting between an open-loop fuel map mode using the fuel map and a closed-loop feedback control mode using the actual value of the oxygen content for regulating the desired air-fuel ratio.

18. The system of claim 17, wherein the muffler is provided with a catalytic element.

19. The system of claim 17, wherein the control unit is configured to repeat a) to c).

20. The system of claim 17, wherein the control unit is configured to repeat a) to g).

* * * * *